United States Patent [19]

Matsuda

[11] 4,255,637
[45] Mar. 10, 1981

[54] LIGHT REGULATOR SWITCH
[75] Inventor: Takehiko Matsuda, Matsudo, Japan
[73] Assignee: Toyostar Corporation, Tokyo, Japan
[21] Appl. No.: 41,323
[22] Filed: May 22, 1979
[30] Foreign Application Priority Data May 26, 1978 [JP] Japan ............................. 53-71220[U]
Oct. 19, 1978 [JP] Japan ........................... 53-143927[U]

[51] Int. Cl.³ ............................................. H01H 9/08
[52] U.S. Cl. ..................................... 200/293; 174/56;
174/66
[58] Field of Search .................... 174/53, 66; 200/293,
200/297, 303, DIG. 2

[56] References Cited
U.S. PATENT DOCUMENTS

| 2,659,792 | 11/1953 | Boardman | 200/303 |
| 2,946,838 | 7/1960 | Bellek | 174/53 |
| 4,045,629 | 8/1977 | Anzani | 200/293 |
| 4,055,724 | 10/1977 | Manecke et al. | 174/66 |
| 4,180,712 | 12/1979 | Lutzenberger et al. | 200/303 |

FOREIGN PATENT DOCUMENTS 650157 10/1962 Canada ................................... 174/53

Primary Examiner—John W. Shepperd
Attorney, Agent, or Firm—Frishauf, Holtz, Goodman & Woodward

[57] ABSTRACT

A radiating plate of a light regulator switch has a bent engaging member integrally formed at one corner of the back side thereof and a hole bored at another corner diagonally opposite to such one corner. A case of the light regulator switch has a detaining recess in and with which the bent engaging member of the radiating plate is received and engaged. The detaining recess has a pair of side walls engaging the side edges of the bent engaging member to prevent sideways shifting thereof and a horizontal wall connecting these side walls. Further, a hole is bored in the case in alignment with the hole of the radiating plate. In assembling the light regulator switch, the case is disposed in back of the radiating plate so that the bent engaging member is located above the detaining recess of the radiating plate, and then the radiating plate is slid downward to receive and engage the bent engaging member in and with the detaining recess. Thereafter, the radiating plate is attached to the case by fitting screws into the holes of the case and the radiating plate.

11 Claims, 5 Drawing Figures

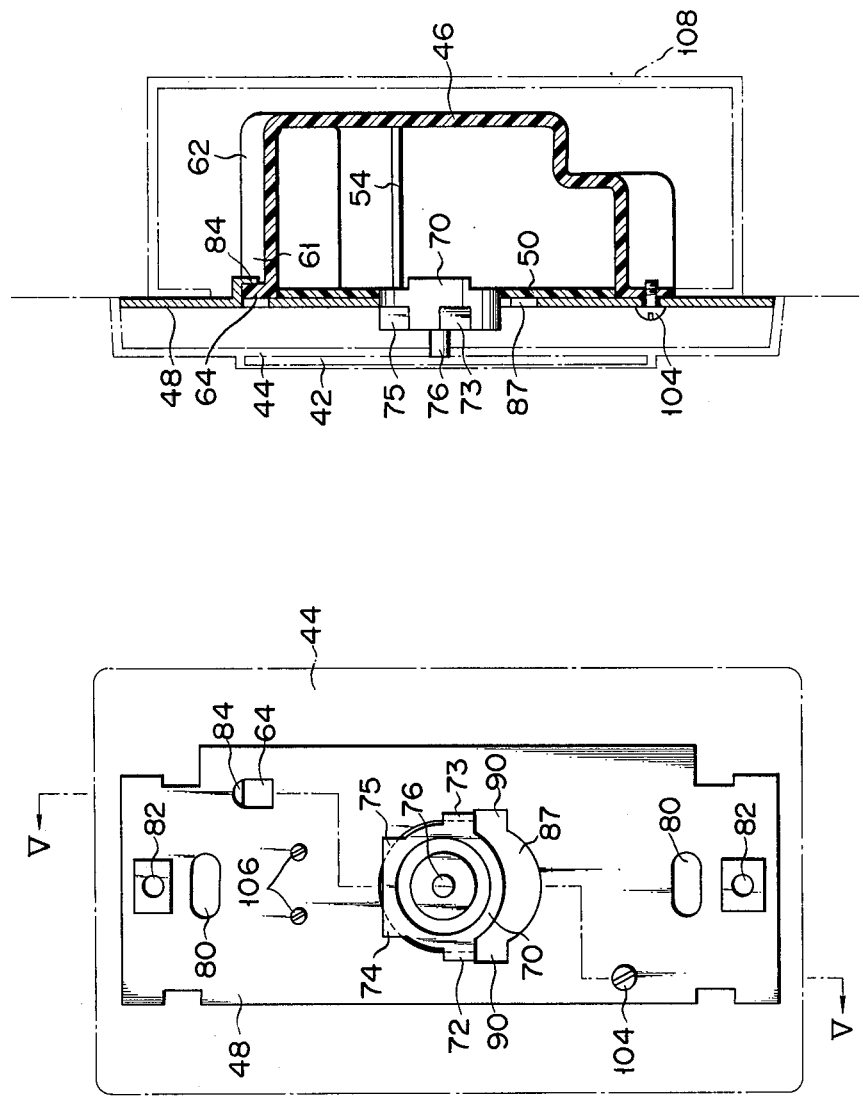

LIGHT REGULATOR SWITCH

BACKGROUND OF THE INVENTION

This invention relates to a switch, and more specifically to a switch for regulating a quantity of light.

Usually attached to a wall, a light regulator switch is so constructed that the quantity of light may be regulated when a front contact plate is touched by part of a human body, e.g. a finger, or by turning a rotatable control knob. In general, a light regulator switch 10, as shown in FIG. 1, comprises a case 12 containing electronic components for volume or light quantity control (not shown), a radiating plate 14 attached in front of the opening of the case, and a front panel 16 covering the front of the radiating plate. The front panel 16 is furnished with a volume or control knob or a front contact plate, a volume knob 18 for the switch being shown. The radiating plate 14 of the switch 10 is attached to a switch box 21 embedded in the wall by means of screws. The light regulator switch 10 is therefore fixed to a wall 20.

In the prior art light regulator switch 10, the case 12 and the radiating plate 14 are put together as follows. As shown in FIG. 2, for example, the case 12 has pairs of projecting engaging members 22 integrally formed on its top and bottom faces, respectively, and a through hole 24 bored on one side. On the other hand, the radiating plate 14 has four bent engaging members 26 integrally formed on the back side thereof and a threaded hole 28. The bent engaging members 26 are capable of receiving the projecting engaging members 22. The case 12 is disposed in back of the radiating plate 14 so that the projecting engaging members 22 are located beside the bent engaging members 26, and then the case 12 is slid sideways to receive and engage the projecting engaging members 22 in and with the bent engaging members 26. The case 12 is slided until the through hole 24 is brought in alignment with the threaded hole 28, and the case 12 and the radiating plate 14 are put together by fitting a screw 30 into the threaded hole 28 through the through hole 24.

As described above, in the assembly of the conventional light regulator switch 10, the four projecting engaging members 22 of the case 12 must be located in parallel with the four bent engaging members 26 of the radiating plate 26. Such parallel location, however, is difficult to achieve because there is provided no guide means. Also, it is difficult to align the through hole 24 with the threaded hole 28 since there is employed no stopper means to restrict the slide of the case 12. Accordingly, it is impossible to fix the case 12 easily and efficiently to the radiating plate 26, and the assembly of the light regulator switch 10 would be a hard task.

SUMMARY OF THE INVENTION

It is therefore an object of this invention to provide a light regulator switch capable of easy assembly.

The above and further objects and novel features of the invention will more fully appear from the following detailed description when the same is read in connection with the accompanying drawings. It is to be expressly understood, however, that the drawing is for purpose of illustration only and is not intended as a definition of the limits of the invention.

BRIEF DESCRIPTION OF THE DRAWINGS

FIG. 4 is a front view of the light regulator switch of FIG. 3; and

FIG. 5 is a sectional view as taken along line V—V of FIG. 4 (boss 70 is not sectional for the simplicity of the drawing).

DETAILED DESCRIPTION OF THE PREFERRED EMBODIMENT

Figure 2:
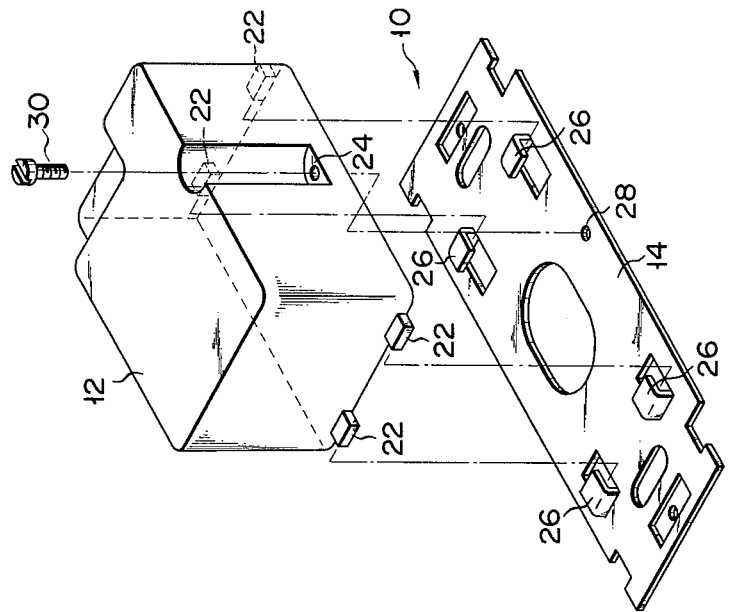
FIG. 2 is a perspective view showing a case and a radiating plate of the prior art light regulator switch of FIG. 1.
Figure 1:
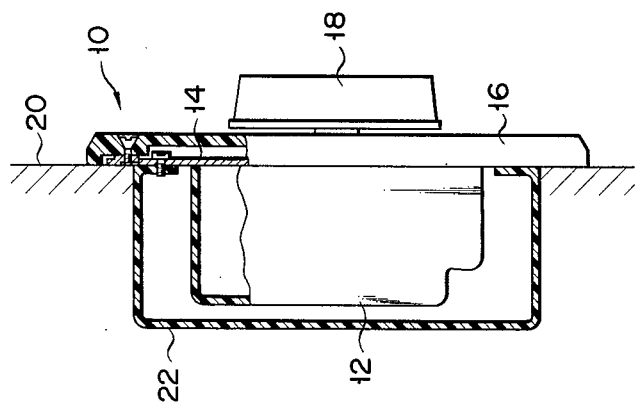
FIG. 1 is a broken side view of a prior art light regulator switch attached to a wall.
Figure 3:
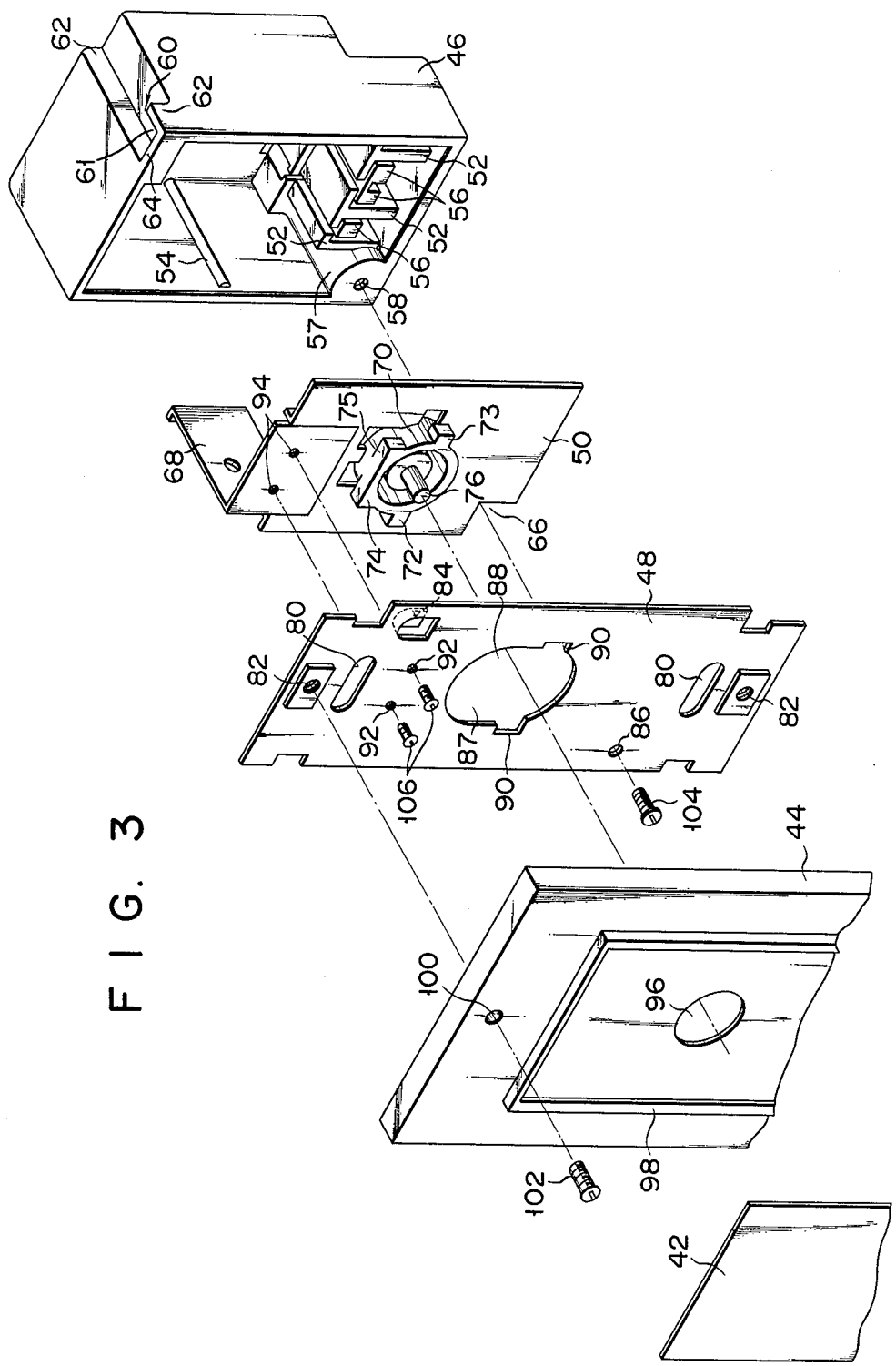
FIG. 3 is a perspective view showing one preferred embodiment of a light regulator switch according to this invention.

FIG. 3 shows one preferred embodiment of this invention. Although in this embodiment, a light regulator switch 40 comprises a conductive front contact plate 42 attached to a front panel 44, it is to be understood that a volume or control knob may be used in place of the front contact plate 42. Further, the light regulator switch 40 comprises a case 46, a radiating plate 48, and an insulating plate 50 located inside the front opening of the case 46.

The case 46 contains electronic components including a resistance element, electronic circuit substrate, semiconductor element, (not shown) etc. A plurality of stepped portions 52 and a pair of ribs 54 for locating the insulating plate 50 in the case 46 are formed at the bottom and both sides of the case 46, respectively. A number of electrode terminals 56 connected to the electronic circuit substrate are arranged adjacent to the stepped portions 52. A radiating plate mounting hole 58 is bored in a corner boss 57 at one corner of the case 46, while a detaining means 60 to detain and engage a bent engaging member of the radiating plate 48 as mentioned later is formed at another corner diagonally opposite to the mounting hole 58. The detaining means 60 includes a pair of side walls 62 engaging the side edges of the bent engaging member to prevent sideways shifting of the engaging member, and a front wall 64 connecting the two side walls.

The insulating plate 50, which tends to insulate electrically the electrode terminals 56 from the radiating plate 48, is formed of a plastic plate with such size and shape as to be fitted in the front opening of the case 46. At one corner of the insulating plate 50 is a notch 66 for avoiding engagement with the boss 57 of the case 46, and a L-shaped semiconductor support 68 is fixed near another corner above the notch 66. In the center of the insulating plate 50, there is an integrally formed circular boss 70 protruding forward. Formed in a body with the boss 70 are four engaging projections 72, 73, 74 and 75 protruding bilaterally and upward. The boss 70 contains a conductive push botton 76 biased by a compression coil spring (not shown), to the front contact plate 42. The conductive push botton 76 is connected to the resistance element (not shown) in the case 46 by means of a lead wire (not shown).

The radiating plate 48 is formed of a metal plate which has such length and width as to block up the front opening of the case 46, vertically extending beyond either end of the opening. The thickness of the radiating plate 48 is a little less than the space between the insulating plate 50 and the back sides of the engaging projections 72, 73, 74 and 75. At the top and bottom end portions of the radiating plate 48, there are bored pairs of slots for attaching the plate 48 to a switch box and front panel mounting threaded holes 82, respectively. Further, the radiating plate 48 has at one corner of its back a bent engaging member 84 to be detained and engaged by a detaining recess 61 of the case 46. At another corner of the plate 48 diagonally opposite to such one corner, there is bored a through hole 86 in alignment with the hole 58 of the case 46. Moreover, the radiating plate 48 has a slide hole 87 in its center, which consists of an elongated hole 88 and a pair of notches 90. The elongated hole 88 vertically extends and is longer than the diameter of the boss 70 of the insulating plate 50 by the sliding length of the radiating plate 48. The notches 90 allow the lateral engaging projections 72 and 73 of the boss 70 to be fitted therein. Furthermore, a pair of through holes 92 are bored through the radiating plate 48, while threaded holes 94 are bored through the semiconductor support 68 in alignment with the through holes 92.

The front panel 44 is formed of plastic, having a center hole 96 through which the conductive push button 76 passes and entirely covering the front of the radiating plate 48. The front panel 44 further has at the front thereof a frame portion 98 to contain the front contact plate 42. The front contact plate 42 is made of conductive material such as aluminium, defining a capacity along with a reference potential when touched by part of a human body, e.g. a finger. At the top and bottom ends of the front panel 44 are through holes 100 (only one shown in FIG. 3) bored in alignment with the threaded holes 82 of the radiating plate 48. The front panel 44 is attached to the radiating plate 48 by fitting screws 102 into the threaded holes 82. At this time, the front contact plate 42 presses the push button 76 inward against the biasing force of the spring contained in the boss, thereby securing electrical contact between the front contact plate 42 and the push button 76.

Now there will be described the assembly of the light regulator switch 40 of the aforementioned construction.

The push button 76 is electrically connected to the electronic component such as a resistance element in the case 46 by means of the lead wire, and the insulating plate 50 with the push button 76 is caused to engage the stepped portions 52 and the ribs 54 of the case 46 and disposed inside the case 46. Then, the lateral engaging projections 72 and 73 of the boss 70 of the insulating plate 50 are brought in alignment with the notches 90 of the slide hole 87 in the radiating plate 48, and then the radiating plate 48 is held against the front of the insulating plate 50 and slid downward as illustrated. Hereupon, the radiating plate 48 is slid downward until the bent engaging member 84 of the radiating plate 48 is received in and engaged with the detaining recess 61. In this position, the radiating plate 48 is attached to the case 46 by means of a screw 104 inserted through the holes 86 and 58 which are in alignment with each other. In doing this, the screw 104 is fitted into the case 46 by using the hole 58 as a threaded hole or by means of a bolt in combination with both these holes 56 and 58 serving as threaded holes. Accompanying the slide of the radiating plate 48, the engaging projections 72, 73, 74 and 75 of the boss 70 engage the edge of the slide hole 87 of the radiating plate 48 and are fixed, as shown in FIG. 4. Thereafter, a pair of screws 106 are fitted into the threaded holes through the holes 92, thereby fixing the insulating plate 50 to the radiating plate 48.

Thus, the single bent engaging member 84 formed an one corner of the back side of the radiating plate 48 is slid to be housed in and engaged with its corresponding detaining recess 61 of the case 46, which can be done much more easily as compared with the case where the conventional four bent engaging members are used. Moreover, the alignment between the hole 86 of the radiating plate 48 and the holes 58 of the case 46 bored at the diagonally opposite corner may be achieved quite easily by turning the case 46 or the radiating plate 48 about the engaging point of the detaining recess 61 and the bent engaging member 84. Since the detaining recess 61 has a pair of side walls 62 to engage the side edges of the bent engaging member 84, sideways shifting of the bent engaging member 84 may be prevented. Accordingly, the radiating plate 48 may be attached to the case 46 without difficulty. In attaching the radiating plate 48 to the case 46, the radiating plate 48 is slid after the engaging projections 72, 73, 74 and 75 formed on the boss 70 of the insulating plate 50 are fitted in the slide hole 87 of the radiating plate 48, so that the engaging projections 72 to 75 may engage the edge of the slide hole 87. Thus, the radiating plate 48 may easily be attached to the insulating plate 50. In consequence, integral assembly of the radiating plate 48, insulating plate 50 and case 46 may be achieved easily and quickly. After such assembly is accomplished, the screws 106 are fitted into the threaded holes 94 through the through holes 92, as required, so as to secure more solid coupling of the radiating plate 48 with the insulating plate 50. The light regulator switch 40 thus assembled from the radiating plate 48, insulating plate 50 and case 46 is attached to a switch box 108 embedded in a wall or any other suitable structure by means of the mounting hole 80 of the radiating plate 48. Finally, as shown in FIG. 5, the front panel 44 attached to the front contact plate 42 is disposed in front of the radiating plate 48 so as to press on the push button 76 against the biasing force of the spring received in the boss 70. Although in the illustrative embodiment of the invention described herein the detaining recess 61 is formed on the top of the case, it may otherwise be formed on the bottom face of the case. It is to be understood that if the detaining recess 61 is located on the bottom face of the case, the positions and shapes of the bent engaging member 84, slide hole 87, and the engaging projections 74 and 75 should be changed. It is further understood by those skilled in the art that the foregoing description is of a preferred embodiment of the disclosed device and that various changes and modifications may be made in the invention without departing from the spirit and scope thereof.

What is claimed is:

1. A light regulator switch comprising:
 a generally rectangular radiating plate (48) including a bent engaging member (84) at only one corner of the back side thereof and a hole (86) at another corner diagonally opposite to said one corner,
 a case (46) including detaining means (60) in and with which the bent engaging member (84) of said radiating plate (48) is vertically slid to be received and engaged, and a hole (58) adapted to be brought to alignment with said hole (86) of said radiating plate (48),
 said radiating plate (48) being rotatable relative to said case (46) about said detaining means (60) to bring said holes of said radiating plate and case into mutual alignment, and coupling means (104) fitted in the holes of said radiating plate and said case, whereby said radiating plate is securely coupled with said case.

2. The light regulator switch according to claim 1, wherein said detaining means 60 includes a detaining recess (61) having a pair of side walls (62) engaging side edges of said bent engaging member (84), thereby preventing sideways shifting of said bent engaging member (60) in said detaining recess (61).

3. The light regulator switch according to claim 2, wherein one of the holes of said radiating plate and said case is a threaded hole and the other is a through hole, and said coupling means includes a screw fitted in said threaded hole through said through hole.

4. The light regulator switch according to claim 2, further comprising an insulating plate (50) including a boss (70) with a plurality of engaging projections (72–75) formed on the outer periphery thereof and contained in said case, and wherein said radiating plate (48) has a slide hole (87) with notches (90) extending from said slide hole (87), said slide hole being loosely fitted over the boss (70) of said insulating plate with said projections aligned with respective notches, whereby said radiating plate is caused to engage behind said engaging projections (72–75) when said insulating plate (50) is vertically slid relative to said case after the loose fitting of said boss (70) within said slide hole (87).

5. The light regulator switch according to claim 4, wherein the boss of said insulating plate has two lateral engaging projections (72,73) protruding on both sides thereof, and the slide hole of said radiating plate is in the form of a vertically elongated ellipse having two lateral notches (90) within which said lateral engaging projections are received.

6. A light regulator switch comprising:
a radiating plate (48) including a bent engaging member (84) at one corner of the back side thereof and a hole (86) at another corner diagonally opposite to said one corner,
a case (46) including detaining means (60) in and with which the bent engaging member (84) of said radiating plate (48) is vertically slid to be received and engaged, and a hole (58) adapted to be brought into alignment with said hole (86) of said radiating plate (48),
an insulating plate (50) contained in said case, said insulating plate (50) including a boss (70) having a least two lateral engaging projections (72,73) formed on the outer periphery thereof and protruding on both sides thereof,
said radiating plate (48) having a slide hole (87) loosely fitted over the boss (70) of said insulating plate, said slide hole (87) of said radiating plate being generally in the form of a vertically elongated ellipse having two lateral notches (90) within which said lateral engaging projections are respectively received, whereby said radiating plate is caused to engage behind said engaging projections when said insulating plate is vertically slid relative to said case after the loose fitting of said boss (70) within said slide hole (87), and
coupling means fitted in the holes of said radiating plate and said case, whereby said radiating plate is securely coupled with said case.

7. The light regulator switch according to claim 6 wherein said projections (72,73) extend a given distance away from said insulating plate (50), and said radiating plate (48) has a thickness less than said given distance.

8. The light regulator switch according to claim 6 or 7, wherein said slide hole (87) is located between said bent engaging member (84) and said hole (86) in said another corner of said radiating plate (48).

9. The light regulator switch according to claim 8 wherein said radiating plate (48) is rotatable relative to said case (46) about said detaining means (60) to bring said holes of said radiating plate and case into mutual alignment.

10. The light regulator switch according to claim 6 or 7 wherein said radiating plate (48) is rotatable relative to said case (46) about said detaining means (60) to bring said holes of said radiating plate and case into mutual alignment.

11. The light regulator switch according to claim 6 or 7, wherein said detaining means (60) includes a detaining recess (61) having a pair of side walls (62) engaging side edges of said bent engaging member (84), thereby preventing sideways shifting of said bent engaging member (60) in said detaining recess (61).

* * * * *